United States Patent
Rose et al.

(10) Patent No.: US 10,673,641 B2
(45) Date of Patent: Jun. 2, 2020

(54) CONNECTING TO A CONFERENCE DEVICE

(71) Applicant: LENOVO Enterprise Solutions (Singapore) PTE. LTD., New Tech Park (SG)

(72) Inventors: Amy L. Rose, Chapel Hill, NC (US); John S. Crowe, Durham, NC (US); Gary D. Cudak, Wake Forest, NC (US); Jennifer J. Lee-Baron, Morrisville, NC (US); Nathan J. Peterson, Oxford, NC (US); Bryan L. Young, Tualatin, OR (US)

(73) Assignee: LENOVO Enterprise Solutions (Singapore) PTE. LTD, New Tech Park (SG)

( * ) Notice: Subject to any disclaimer, the term of this patent is extended or adjusted under 35 U.S.C. 154(b) by 272 days.

(21) Appl. No.: 15/068,230

(22) Filed: Mar. 11, 2016

(65) Prior Publication Data

US 2017/0264446 A1 Sep. 14, 2017

(51) Int. Cl.
*H04L 12/18* (2006.01)
*H04W 4/80* (2018.01)
*H04M 3/56* (2006.01)

(52) U.S. Cl.
CPC ...... *H04L 12/1818* (2013.01); *H04L 12/1813* (2013.01); *H04L 12/1822* (2013.01); *H04M 3/56* (2013.01); *H04W 4/80* (2018.02)

(58) Field of Classification Search
CPC ............ H04L 12/1813; H04L 12/1818; H04L 12/1822; H04W 4/008
USPC ....................................................... 709/204
See application file for complete search history.

(56) References Cited

U.S. PATENT DOCUMENTS

| | | |
|---|---|---|
| 6,760,599 B1 | 7/2004 | Uhlik |
| 7,024,479 B2 | 4/2006 | Shah |
| 7,047,311 B2 | 5/2006 | Oishi |
| 7,127,510 B2 | 10/2006 | Yoda |
| 7,219,189 B1 | 5/2007 | Ryu |
| 7,643,835 B1 | 1/2010 | Nosack |

(Continued)

OTHER PUBLICATIONS

Andy Wolber, Improve meeting rooms with Wifi, Hangouts, and screen-sharing, in Google in Enterprise, Jul. 9, 2013, http://www.techrepublic.com/blog/google-in-the-enterprise/improve-meeting-rooms-with-wifi-hangouts-and-screen-sharing/, Last visited Jan. 12, 2016.

(Continued)

*Primary Examiner* — Chris Parry
*Assistant Examiner* — Adam A Cooney
(74) *Attorney, Agent, or Firm* — Kunzler Bean & Adamson, PC; Bruce R. Needham (57) ABSTRACT

Apparatuses, methods, systems, and program products are disclosed for connecting to a conference device. A device module detects a client device within a short-range wireless communication distance of a conference device. The conference device is reservable for a conference and configured to present content received from the client device. A notification module that sends a notification to the client device in response to determining that the conference device is available. The notification invites the client device to connect to the conference device. A connection module connects the conference device to the client device in response to receiving a connection confirmation from the client device.

20 Claims, 5 Drawing Sheets

(56) References Cited

U.S. PATENT DOCUMENTS

| | | | |
|---|---|---|---|
| 8,065,175 B1* | 11/2011 | Lewis | G06Q 10/063116 705/7.19 |
| 8,717,931 B2 | 5/2014 | Taniuchi | |
| 2005/0266855 A1 | 12/2005 | Zeng | |
| 2006/0046709 A1 | 3/2006 | Krumm | |
| 2006/0062367 A1* | 3/2006 | Christenson | G06Q 10/1095 379/202.01 |
| 2006/0187858 A1 | 8/2006 | Kenichi | |
| 2006/0219830 A1 | 10/2006 | Nilsson-Wulff | |
| 2008/0095072 A1 | 4/2008 | Shao | |
| 2008/0180227 A1 | 7/2008 | Lee | |
| 2008/0239995 A1* | 10/2008 | Lee | H04L 12/1818 370/260 |
| 2009/0102642 A1 | 4/2009 | Huseth | |
| 2009/0103503 A1 | 4/2009 | Chhabra | |
| 2009/0111485 A1 | 4/2009 | Kitani | |
| 2010/0246419 A1 | 9/2010 | Batta | |
| 2011/0040599 A1* | 2/2011 | Guruprasad | G06Q 10/109 705/7.18 |
| 2011/0271332 A1* | 11/2011 | Jones | H04L 9/3247 726/7 |
| 2012/0230193 A1 | 9/2012 | Fang | |
| 2012/0249300 A1 | 10/2012 | Avital | |
| 2012/0297055 A9 | 11/2012 | Raleigh | |
| 2013/0029606 A1 | 1/2013 | Wang | |
| 2013/0038673 A1* | 2/2013 | Hiller | G06Q 10/06 348/14.07 |
| 2013/0052990 A1 | 2/2013 | Zhang | |
| 2013/0138796 A1 | 5/2013 | Nicholson | |
| 2013/0295962 A1 | 11/2013 | Manroa | |
| 2014/0279889 A1* | 9/2014 | Luna | G06F 17/30575 707/626 |
| 2015/0121466 A1* | 4/2015 | Brands | H04L 63/08 726/4 |
| 2015/0356516 A1* | 12/2015 | Kagan | G06Q 10/1095 705/7.19 |
| 2016/0080432 A1* | 3/2016 | Seferian | H04L 65/1069 348/14.08 |
| 2016/0080433 A1* | 3/2016 | Liu | H04M 1/7253 370/261 |
| 2016/0105553 A1* | 4/2016 | Forrester | H04M 3/42365 455/416 |
| 2016/0227381 A1* | 8/2016 | Bargetzi | H04W 4/06 |

OTHER PUBLICATIONS

Cornell University, Working with Resource Accounts in Outlook, IT@Cornell, Last updated Nov. 18, 2014, http://www.it.cornell.edu/services/outlook2010/howto/calendar/resource.cfm, Last visited Jan. 12, 2016.

U.S. Appl. No. 13/305,525, filed Nov. 28, 2011, Office Action dated May 14, 2013.

U.S. Appl. No. 13/305,525, filed Nov. 28, 2011, Final Office Action dated Dec. 13, 2013.

U.S. Appl. No. 13/305,525, filed Nov. 28, 2011, Office Action dated Aug. 28, 2014.

U.S. Appl. No. 13/305,525, filed Nov. 28, 2011, Final Office Action dated Mar. 13, 2015.

U.S. Appl. No. 13/305,525, filed Nov. 28, 2011, Office Action dated Nov. 5, 2015.

U.S. Appl. No. 13/305,525, filed Nov. 28, 2011, Final Office Action dated Jun. 6, 2016.

* cited by examiner

CONNECTING TO A CONFERENCE DEVICE

FIELD OF THE INVENTION

The subject matter disclosed herein relates to conference systems and more particularly relates to connecting to a conference device.

BACKGROUND

Conference rooms may include a variety of conference resources for use in facilitating a meeting, conference, etc. In conventional conference systems, if a user desires to present content from his or her device on a conference device, the user may need to manually connect or link his or her device to the conference device (e.g., connecting cables, wires, etc. between the user's device and the conference device) instead of the user's device automatically connecting to and communicating with the conference device. In addition, the user may not know if a device in a conference system is available for use or if the device is unavailable, for example because of another reservation.

BRIEF SUMMARY

An apparatus for connecting to a conference device is disclosed. A method and computer program product also perform the functions of the apparatus. In one embodiment an apparatus includes a device module that detects a client device within a short-range wireless communication distance of a conference device. A conference device, in some embodiments, is reservable for a conference and configured to present content received from a client device.

An apparatus, in a further embodiment, includes a notification module that sends a notification to a client device in response to determining that a conference device is available. A notification may invite a client device to connect to a conference device. In some embodiments, an apparatus includes a connection module that connects a conference device to a client device in response to receiving a connection confirmation from a client device.

In some embodiments, a notification module sends a notification to a client device indicating that the conference device is unavailable in response to determining that a conference device is reserved. In a further embodiment, a notification module sends a notification to a client device in response to determining that a client device is associated with a scheduled conference.

In some embodiments, an apparatus includes a schedule module that checks a calendar event associated with a client device to determine whether the client device has been invited to a scheduled conference. In some embodiments, a schedule module determines whether a client device is associated with an organizer and/or a presenter of a conference based on a calendar event. A notification module may send a notification to a client device in response to determining that the client device is associated with a conference organizer and/or conference presenter.

An apparatus, in a further embodiment, includes a directory module that checks a directory service of an organization to determine whether a client device has been invited to a scheduled conference. In some embodiments, a directory module determines whether a client device is associated with an organizer and/or a presenter of the conference according to a directory service. A notification module may send a notification to a client device in response to determining that the client device is associated with a conference organizer and/or conference presenter.

In certain embodiments, a notification module sends a notification to a client device in response to determining that the client device is on a predetermined list of devices authorized to connect to a conference device. In some embodiments, a notification module sends a notification to a client device in response to an organizer of a conference authorizing the client device to connect to a conference device.

In one embodiment, a conference device is connected to the client device using a short-range wireless communication protocol. A short-range wireless communication protocol may include a Bluetooth® protocol, a near-field communication protocol, an infrared communication protocol, a radio protocol, and a Wi-Fi protocol.

In some embodiments, a conference device includes one or more of a telephone, a projector, a computer, a television, and a sound system. In various embodiments, a notification is sent to a client device using an electronic message. An electronic message may include a text message, an email, an instant message, and a push notification.

A method, in one embodiment, includes detecting, by use of a processor, a client device within a short-range wireless communication distance of a conference device. A conference device, in some embodiments, is reservable for a conference and configured to present content received from a client device. A method, in a further embodiment, includes sending a notification to a client device in response to determining that a conference device is available. A notification may invite a client device to connect to a conference device. A method, in some embodiments, includes connecting a conference device to a client device in response to receiving a connection confirmation from a client device.

In some embodiments, a method includes sending sends a notification to a client device indicating that the conference device is unavailable in response to determining that a conference device is reserved. In a further embodiment, a method includes sending a notification to a client device in response to determining that a client device is associated with a scheduled conference.

In various embodiments, a method includes checking a calendar event associated with a client device to determine whether the client device has been invited to a scheduled conference. In one embodiment, a method includes determining whether a client device is associated with an organizer and/or a presenter of a conference based on a calendar event. In some embodiments, a notification is sent to a client device in response to determining that the client device is associated with a conference organizer and/or conference presenter.

In a further embodiment, a method includes checking a directory service of an organization to determine whether a client device has been invited to a scheduled conference. In some embodiments, a method includes determining whether a client device is associated with an organizer and/or a presenter of the conference according to a directory service. A notification may be sent to a client device in response to determining that the client device is associated with a conference organizer and/or conference presenter.

A program product, in one embodiment, includes a computer readable storage medium that stores code executable by a processor. In some embodiments, executable code includes code to perform detecting a client device within a short-range wireless communication distance of a conference device. A conference device, in some embodiments, is reservable for a conference and configured to present content received from a client device. In a further embodiment, executable code includes code to perform sending a notification to a client device in response to determining that a conference device is available. A notification may invite a client device to connect to a conference device. Executable code, in some embodiments, includes code to perform connecting a conference device to a client device in response to receiving a connection confirmation from a client device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
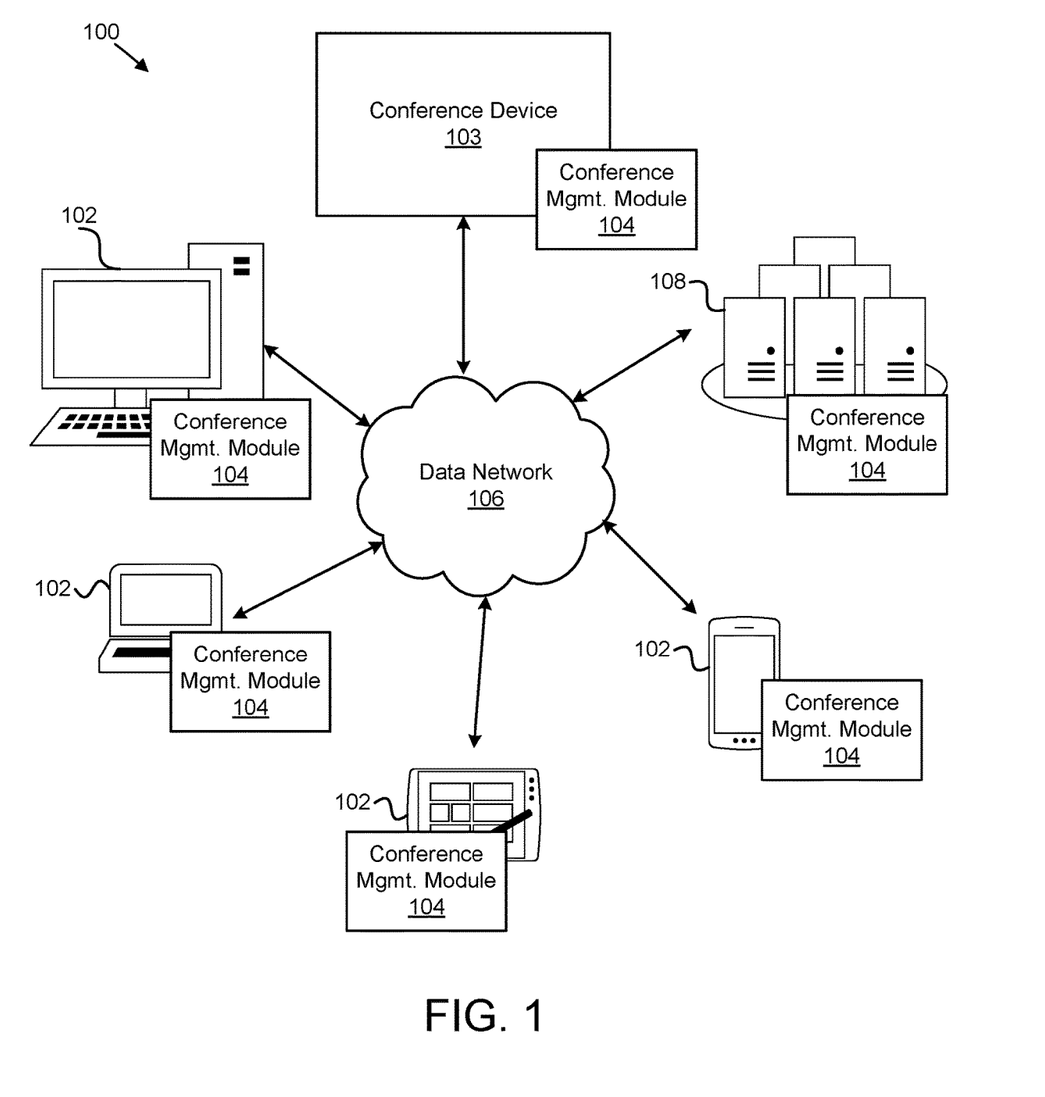
FIG. 1 is a schematic block diagram illustrating one embodiment of a system for connecting to a conference device.

FIG. 1 depicts one embodiment of a system 100 for connecting to a conference device 103. In one embodiment, the system 100 includes one or more information handling devices 102, one or more conference management modules 104, one or more data networks 106, one or more servers 108, and one or more conference devices 103. In certain embodiments, even though a specific number of information handling devices 102, conference management modules 104, data networks 106, servers 108, and conference devices 103 are depicted in FIG. 1, one of skill in the art will recognize, in light of this disclosure, that any number of information handling devices 102, conference management modules 104, data networks 106, servers 108, and conference devices 103 may be included in the system 100 for connecting to a conference device 103.

In one embodiment, the system 100 includes one or more information handling devices 102. The information handling devices 102 may include a desktop computer, a laptop computer, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, or another computing device including a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium. As used herein, an information handling device 102 may also be known as a client device.

In certain embodiments, the information handling devices 102 are communicatively coupleable to one or more servers 108 and/or one or more conference devices 103 via a data network 106, described below. The information handling devices 102, in a further embodiment, are capable of executing various programs, program code, applications, instructions, functions, and/or the like, which may access, store, download, upload, and/or the like data located on one or more servers 108. In some embodiments, the information handling devices 102 are configured to stream, transmit, or otherwise deliver content to another information handling device 102, a server 108, a conference device 103, and/or the like.

In one embodiment, a conference device 103 includes a television, a projector, a telephone, a sound system, a monitor, a computer, an overhead projector, and/or the like. A conference device 103 may be configured to connect to a data network 106 to communicate with different devices such as information handling devices 102, servers 108, other conference devices 103, and/or the like. A conference device 103, in some embodiments, may connect to one or more information handling devices 102, over a data network 106, and stream, present, display, and/or the like content from and/or to the information handling device 102. The conference device 103, in a further embodiment, is part of a conference system that includes a plurality of conference devices 103 that are located in a conference room, an office, an auditorium, a library, and/or the like.

In some embodiments, a conference device 103 may be associated with a location, a room, an office, and/or the like. In a further embodiment, a conference device 103 may be reservable by a user using a calendar application, a scheduling application, a reservation system, and/or the like. Such an application/system may be integrated with a user's email client, calendar client, and/or the like. In such an embodiment, for example, a user may create a conference or meeting event in an email client, view which conference devices 103 and/or conference rooms that include conference devices 103 are available, and reserve a particular conference device 103 and/or conference room that includes a conference device 103. The conference/meeting event may then be sent to one or more other attendees and/or presenters in the conference. In certain embodiments, a conference device 103 is identified using a unique identifier, such as a device name, a media access controller ("MAC") address, an internet protocol ("IP") address, and/or the like.

In one embodiment, the conference management module 104 is configured to dynamically connect a client device 102 (e.g., an information handling device 102) to a conference device 103 or resource based on a client device 102 being within a certain proximity of the conference device 103. In one embodiment, the conference management module 104 is configured to detect a client device 102 is within a short-range wireless communication distance of a conference device 103. In some embodiments, the conference management module 104 is configured to send a notification to a client device 102 in response to determining that the conference device 103 is available. In a further embodiment, the conference management module 104 is configured to connect the conference device 103 to a client device 102 in response to receiving a connection confirmation from the client device 102. In certain embodiments, the conference management module 104 is located on a conference device 103, an information handling device 102, and/or the like.

In various embodiments, the conference management module 104 may be embodied as a hardware appliance that can be installed or deployed on an information handling device 102, on a conference device 103, on a server 108, or elsewhere on the data network 106. In certain embodiments, a conference management module 104 may include a hardware device such as a secure hardware dongle or other hardware appliance device (e.g., a set-top box, a network appliance, or the like) that attaches to a device such as a conference device 103, a laptop computer, a server 108, a tablet computer, a smart phone, or the like, either by a wired connection (e.g., a USB connection) or a wireless connection (e.g., Bluetooth®, Wi-Fi®, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the conference management module 104 may include a power interface, a wired and/or wireless network interface, a graphical interface that attaches to a display, and/or a semiconductor integrated circuit device as described below, configured to perform the functions described herein with regard to the conference management module 104.

The conference management module 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the conference management module 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the conference management module 104.

The semiconductor integrated circuit device or other hardware appliance of the conference management module 104, in certain embodiments, includes and/or is communicatively coupled to one or more volatile memory media, which may include but is not limited to: random access memory ("RAM"), dynamic RAM ("DRAM"), cache, or the like. In one embodiment, the semiconductor integrated circuit device or other hardware appliance of the conference management module 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more servers 108, in one embodiment, may be embodied as blade servers, mainframe servers, tower servers, rack servers, and/or the like. The one or more servers 108 may be configured as a mail server, a web server, an application server, an FTP server, a media server, a data server, a web server, a file server, a virtual server, and/or the like. In some embodiments, the one or more servers 108 may be located on an organization's premises, in a data center, in the cloud, and/or the like. The one or more servers 108 may be accessed remotely over a data network 106 like the Internet, or locally over a data network 106 like an intranet.

Figure 2:
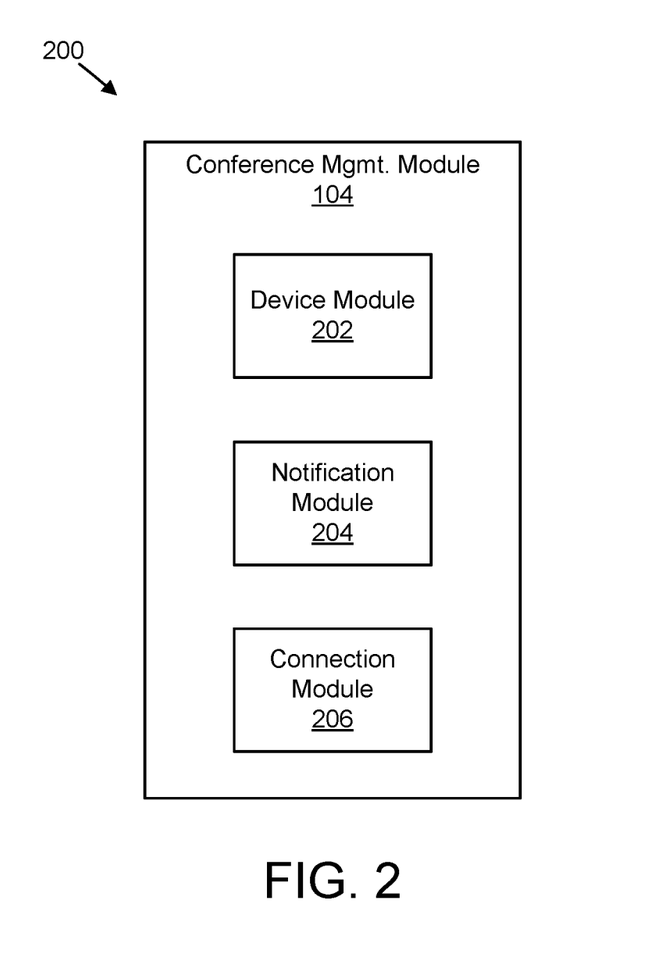
FIG. 2 is a schematic block diagram illustrating one embodiment of an apparatus for connecting to a conference device.

FIG. 2 depicts one embodiment of an apparatus 200 for connecting to a conference device 103. The apparatus 200 may include an embodiment of a conference management module 104. The conference management module 104 may include one or more of a device module 202, a notification module 204, and a connection module 206, which are described in more detail below.

The device module 202, in one embodiment, is configured to detect a client device 102 that is within a proximity of a conference device 103. In one embodiment, the device module 202 detects that a client device 102 is within a short-range wireless communication distance of a conference device 103. For example, the device module 202 may detect that a user's smart phone is within a Bluetooth® communication distance of a smart television located in a conference room. Other short-range wireless communication protocols may include NFC, Bluetooth® LE, infrared, Wi-Fi, and/or the like.

In one embodiment, the device module 202 detects a client device 102 is within a proximity of a conference device 103 based on a detected signal strength of a signal (e.g., a Wi-Fi signal, a Bluetooth® signal, and/or the like) transmitted or emitted from a client device 102 and/or a conference device 103. In some embodiments, the device module 202 detects a client device 102 is within a proximity of a conference device 103 based on data received from one or more sensors. For example, a conference projector may include one or more proximity sensors configured to detect an object within a sensing distance of the projector. Other sensors may include a camera, a microphone, an electromagnetic field meter, infrared sensors, motion sensors, and/or the like. In such an embodiment, the device module 202 may first use data from a sensor to determine whether an object is within a proximity of the conference device 103, and then determine whether the object is client device 102 that has short-range wireless communication capabilities.

The notification module 204, in one embodiment, is configured to send a notification to a client device 102 in response to determining that the conference device 103 is available for use. In certain embodiments, as described in more detail below, the notification module 204 determines whether a conference device 103 is available by checking a reservation system for conference devices 103 and/or conference rooms, checking a calendar associated with the conference device 103, and/or the like. For example, the notification module 204 may determine that a conference projector is available for use by checking an online reservation system that keeps a schedule of conference devices 103 and allows users to reserve conference devices 103 and/or conference rooms. In some embodiments, the notification module 204 sends a notification to the client device 102 indicating that the conference device 103 is not currently available in response to determining that the conference device is reserved.

In certain embodiments, the notification module 204 sends a notification to a client device 102 that indicates the client device 102 is within a communication proximity of the conference device 103 and invites the client device 102 to connect to the conference device 103. The notification module 204, for example, may send a push notification to an application executing on a client device 102, such as a meeting or collaboration program, to notify a user of the client device 102 that the conference device 103 is available for use. In such an embodiment, the notification module 204 may be integrated with or otherwise associated with various software, like meeting or collaboration software such as Microsoft's® Lync® program, which may receive the push notification, or other types of notifications, and present the notification within the software's interface. The notification module 204 may utilize other electronic communication methods to notify a user that a conference device 103 is available such as text messages, email messages, instant messages, audible and/or visual signals (e.g., beeping sounds, flashing lights, etc.) presented on the conference device 103 and/or the client device 102, and/or the like.

In some embodiments, the notification module 204 sends a notification to a client device 102 in response to determining that the client device 102 is on a predetermined list of client devices 102 that are authorized to connect to a conference device 103. As explained below, a directory service, for example, may maintain a list of authorized devices that can connect to the conference device 103, which the notification module 204 can query using identifying information for the client device 102 (e.g., MAC address, IP address, device name, etc.), to determine whether the client device 102 is on the list. If so, the notification module 204 may send a notification to the client device 102 to invite the client device 102 to connect to the conference device 103.

In one embodiment, the notification module 204 sends a notification to a client device 102 in response to determining that the client device 102 is associated with a list of invitees/attendees to a conference. For example, the notification module 204 may query a calendar, a directory service, and/or the like associated with the client device 102 (e.g., using the schedule module 302 or the directory module 304, described below) to determine whether the client device 102 or the user/owner of the client device 102 is on the list of users/devices invited to the conference. If so, the notification module 204 may send a notification to the client device 102 to invite the client device 102 to connect to the conference device 103.

In a further embodiment, the notification module 204 sends a notification to a client device 102 in response to an organizer of the conference authorizing the client device 102 to connect to the conference device 103. For example, the device module 202 may detect a client device 102 within a communication proximity of the conference device 103. In response to detecting the client device 102, the notification module 204 may send a notification to the organizer of the conference that informs the organizer that a client device 102 is available to present on the conference device 103 and provides the organizer with an option to allow the client device 102 to connect to the conference device 103 or reject the client device 102 from connecting to the conference device 103 to present content on the conference device 103.

In one embodiment, the notification may include information associated with the conference device 103, such as the room/location of the conference device 103, an identifier for the conference device 103, how long the conference device 103 is available or reserved, when the conference device 103 will be available/reserved, a reservation schedule for the conference device 103 for the upcoming hour, day, week, etc., other conference devices 103 associated with or connected to the conference device 103 (e.g., other conference devices 103 within the same conference room/location as the conference device 103), the type of the conference device 103 (e.g., telephone, monitor, television, etc.), and/or the like.

As mentioned above, the notification may include an invitation to connect to the conference device 103, e.g., to use the conference device 103 for a conference, meeting, and/or the like. In one embodiment, the connection module 206 connects the conference device 103 to a client device 102 in response to receiving a connection confirmation from the client device 102. For example, in response to accepting an invitation to connect to the conference device 103, the client device 102 and the conference device 103 may pair using a Bluetooth® connection. As described above, the client device 102 and the conference device 103 may connect using various communication protocols such as Bluetooth®, Wi-Fi, NFC, and/or the like.

In some embodiments, the notification module 204 may send the notification to a client device 102 over a different communication channel/protocol than a communication channel/protocol that is used to transmit content from/to the client device 102/conference device 103. For example, the notification module 204 may send the notification to the client device 102 using a Bluetooth® connection, and the connection module 206, after determining the client device 102 confirmed connecting to the conference device 103, may enable a Wi-Fi connection between the client device 102 and the conference device 103 so that content may be transmitted to/from the client device 102/conference device 103 using the Wi-Fi connection.

The connection module 206, in a further embodiment, verifies that the client device 102 is compatible with the conference device 103. In such an embodiment, the connection module 206 may determine the networking capabilities of the client device 102 (e.g., the wireless communication capabilities of the client device 102), the applications executing/installed on the client device 102, the hardware specifications of the client device 102, and/or the like, to determine whether the client device 102 is capable of communicating with, and streaming content to, the conference device 103. For example, the connection module 206 may notify the client device 102 that it is not compatible with the conference device 103, and therefore may not connect to the conference device 103, in response to determining that the client device 102 does not have a content streaming application/protocol installed that is compatible with the conference device 103.

In one example, a group of employees in an office may be looking for an available conference room with a projector. As the group walks nearby a conference room with a projector, the device module 202 may detect that at least one of the employees' smart devices, such as a tablet computer, is within a short-range wireless communication distance of the projector. The notification module 204 may determine whether the projector is available for use, and if so, sends a notification to the employee's tablet computer (e.g., over Bluetooth®, NFC, etc.) that indicates the projector is available. The notification may also include an invitation to connect to the projector. The user of the tablet computer may accept or reject the invitation. If accepted, the connection module 206 connects the tablet computer to the projector, and the group can commence their meeting and present content from the tablet computer during the meeting on the projector.

Figure 3:
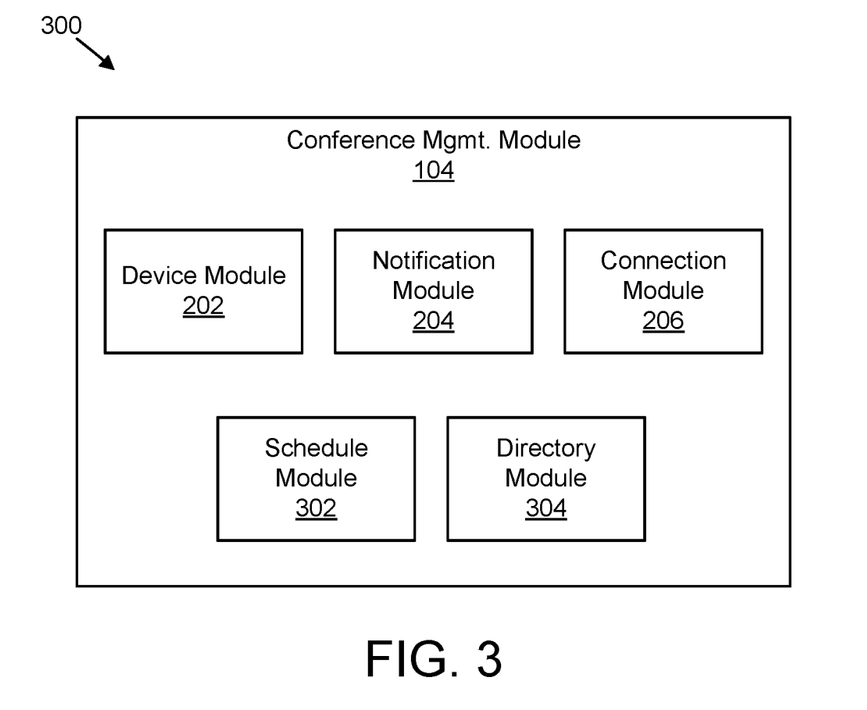
FIG. 3 is a schematic block diagram illustrating one embodiment of another apparatus for connecting to a conference device.

FIG. 3 depicts one embodiment of an apparatus 300 for connecting to a conference device 103. In one embodiment, the apparatus 300 includes an embodiment of a conference management module 104. The conference management module 104, in one embodiment, includes one or more of a device module 202, a notification module 204, and a connection module 206, which may be substantially similar to the device module 202, the notification module 204, and the connection module 206 described above with reference to FIG. 2. The conference management module 104 may also include one or more of a schedule module 302 and a directory module 304, which are described in more detail below.

In one embodiment, the notification module 204 sends a notification to a client device 102 in response to determining that the client device 102 is associated with a scheduled conference. In a further embodiment, the schedule module 302 checks a calendar event associated with a client device 102 to determine whether the client device 102 has been invited to a scheduled conference associated with the conference device 103, e.g., a conference that has reserved the conference device 103 or the conference room where the conference device 103 is located. If so, then the notification module 204 may send a notification to the client device 102 to invite the client device 102 to connect to the conference device 103.

The schedule module 302, in one embodiment, may check a calendar associated with a client device 102 in response to the device module 202 detecting the client device 102 is within a communication proximity of the conference device 103. The calendar associated with a client device 102 may include a local calendar stored on the client device 102, a remote calendar stored at a network location (e.g., an intranet server, a cloud server, and/or the like), and/or the like.

For example, in response to the device module 202 detecting a tablet computer is within a short-range wireless communication distance of the conference device 103, the schedule module 302 may query a local calendar stored on the tablet device, such as a calendar associated with the user's email application, to determine whether the calendar includes an event for a meeting that has been scheduled for the current time (or is scheduled to begin before or within a predefined time period of the current time). If so, the notification module 204 may send a notification to the tablet device to invite the user to connect to the conference device 103 using the tablet device.

In certain embodiments, the schedule module 302 further determines whether a client device 102 is associated with a meeting that has been scheduled in a conference room where a conference device 103 is located and/or whether the calendar event includes information regarding the reservation of the conference device 103. For example, the schedule module 302, after determining from a calendar associated with a smart phone that the smart phone is associated with a scheduled meeting, further determines whether a monitor within a communication distance of the smart phone is also associated with the meeting, e.g., whether the monitor has been reserved for the meeting and/or whether a conference room that includes the monitor has been reserved. If so, the notification module 204 may send a notification to the smart phone to invite the user to connect to the conference device 103 using the smart phone.

In a further embodiment, the schedule module 302 determines whether the client device 102 is associated with an organizer and/or a presenter of the conference based on a calendar event. In certain embodiments, the notification module 204 may send an invitation to connect to a conference device 103 to client devices 102 that are associated with an organizer/presenter for the conference, and not to other attendees of the conference that are not designated as organizers/presenters. Thus, the schedule module 302 may determine from the calendar event whether the client device 102 was the device that initiated the scheduled conference, or whether the calendar event specifies the organizers/presenters of the conference and whether one of the specified organizers/presenters is associated with the client device 102.

For example, the calendar event may specify the user who created the calendar event, and/or one or more presenters for the scheduled conference, and the schedule module 302 may use the specified organizer/presenter information (e.g., a user name, a user ID, and/or the like) and determine whether the client device 102 has a user account that matches the specified organizer/presenter information, or is otherwise associated with a user that matches the specified organizer/presenter information.

In one embodiment, the directory module 304 checks a directory service of an organization to determine whether the client device 102 has been invited to a scheduled conference. As used herein, a directory service, in one embodiment, maps the names of network resources to their respective network addresses. Other information may also be stored in the directory, such as an owner of the device, a schedule/calendar for the owner, a listing of other devices (e.g., conference devices 103) connected to the network 106, and/or the like. A directory service, in some embodiments, may be managed by an organization to track various devices and their associated owners within the organization. The directory service may also maintain a list of conference devices 103, and a reservation system for the conference devices 103. An example of a directory service may be Active Directory® by Microsoft®.

In one embodiment, the directory service also maintains an indication of whether or not a client device 102 or a user associated with a client device 102 is authorized to use a conference device 103 and the directory module 304 determines whether or not the client device 102 is authorized to use the conference device 103. For example, the directory service may list for each employee a group where the employee works and certain conference devices 103 may be authorized for use by a particular group. The directory module 304 may determine if a client device 102 is authorized for use of a conference device 103 by determining if the user of the client device 102 is part of a group that is authorized for use by the conference device 103.

In certain embodiments, the directory module 304 may determine who the owner of a client device 102 is by querying a directory service of an organization. Furthermore, the directory module 304 may determine the owner's ID, schedule, and/or the like. The directory module 304 and/or the schedule module 302 may check a calendar managed by the directory service for a calendar event associated with a client device 102 to determine whether the client device 102 has been invited to a scheduled conference associated with a conference device 103, e.g., a conference that has reserved the conference device 103 or the conference room where the conference device 103 is located. If so, then the notification module 204 may send a notification to the client device 102 to invite the client device 102 to connect to the conference device 103. In contrast, the directory module 304 may check the calendar and determine that the conference device 103 is scheduled by another user and the notification module 204 may not send a notification or may send a notification that the conference device 103 is unavailable.

The directory module 304, in one embodiment, may query a directory service in response to the device module 202 detecting the client device 102 is within a communication proximity of the conference device 103. For example, in response to the device module 202 detecting a tablet computer is within a short-range wireless communication distance of the conference device 103, the directory module 304 may query the directory service of an organization (which may be stored on a central server within the organization) to determine an owner of the client device 102 and/or whether the directory service includes information associated with the client device 102 of an event for a meeting that has been scheduled for the current time (or is scheduled to begin before or within a predefined time period of the current time). If so, the notification module 204 may send a notification to the tablet device to invite the user to connect to the conference device 103 using the tablet device.

In a further embodiment, the directory module 304 determines whether the client device 102 is associated with an organizer and/or a presenter of the conference in response to querying the directory service with identifying information for the user and/or the client device 102. In certain embodiments, as described above, the notification module 204 may send an invitation to connect to a conference device 103 to client devices 102 that are associated with an organizer/presenter for the conference, and not to other attendees of the conference that are not designated as organizers/presenters. Thus, the directory module 304 may determine from the directory service who the owner of the client device 102 is, whether the client device 102 was the device that initiated the scheduled conference, and/or whether the owner is an organizer/presenter of the conference.

For example, the directory module 304 may determine an identifier for a client device 102, such as a laptop computer, such as the laptop's MAC or IP address, and query the directory service with the identifying information to determine the owner of the client device 102. The directory module 304 may also query the directory service for other information, such as the owner's schedule to determine whether the owner has a scheduled meeting or conference around the current time, and, if so, whether the owner is the organizer of and/or a presenter at the conference. The directory module 304 may also work with the schedule module 302 to determine whether the client device 102 has been invited to or is otherwise associated with a scheduled meeting.

Figure 4:
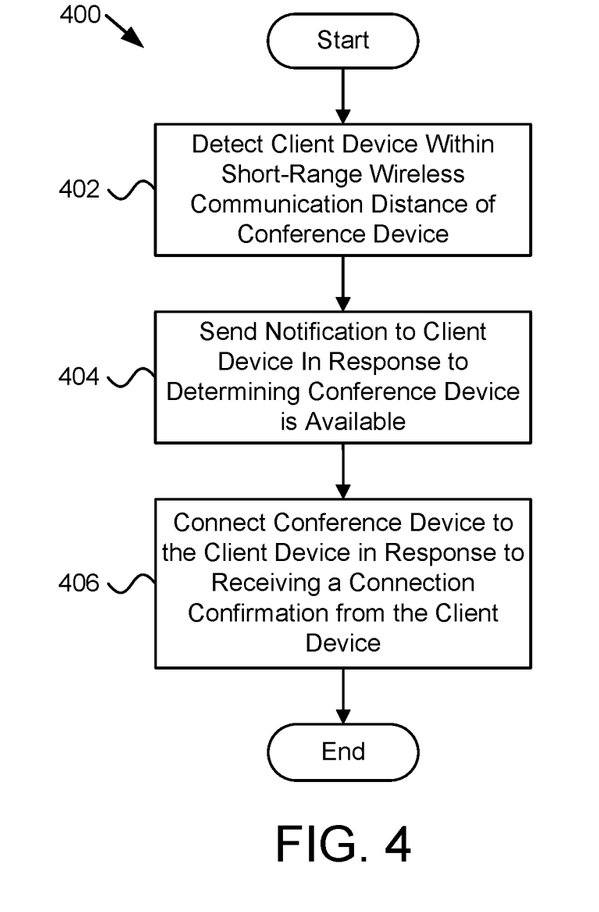
FIG. 4 is a schematic flow chart diagram illustrating one embodiment of a method for connecting to a conference device.

FIG. 4 depicts one embodiment of a method 400 for connecting to a conference device 103. In one embodiment, the method 400 begins and detects 402 a client device 102 that is within a short-range wireless communication distance of a conference device 103. The short-range wireless communication distance may be detected based on a detected signal transmitted by the client device 102 and/or the conference device 103, based on a strength of the detected signal, based on data from one or more sensors (e.g., proximity sensors, motion sensors, etc.), and/or the like. In some embodiment, the device module 202 detects 402 a client device 102 is within a short-range wireless communication distance of a conference device 103.

In certain embodiments, the conference device 103 is reservable for a conference or meeting. For example, a user may access a reservation system and reserve a conference room and/or a particular conference device 103, such as a projector, for use during a scheduled meeting or conference. In a further embodiment, the conference device 103 is configured to present content received from a client device 102. For example, a projector may present audio and/or video content streamed to it from a laptop computer, or a conference telephone may present audio content spoken by a user on a smart phone, and/or the like.

In a further embodiment, the method 400 sends 404 a notification to a client device 102 in response to determining that the conference device 103 is available. For example, the method 400 may check a reservation system, or other calendar/schedule, associated with the conference device 103 to determine whether the conference device 103, and/or a conference room where the conference device 103 is located, has been reserved. In certain embodiments, the notification includes an invitation for the client device 102 to connect to the conference device 103.

For example, in response to receiving the notification, the method 400 may present a prompt on the client device 102 to confirm whether the user would like to connect to the conference device 103 or not. The notification may contain other information such as an identifier for the conference device 103, the type of the conference device 103, where the conference device 103 is located, other conference devices 103 associated with the conference device 103, how long the conference device 103 is available, a reservation schedule for the conference device 103, and/or the like. In one embodiment, the notification module 204 sends 404 the notification to the client device 102 to invite the client device 102 to connect to the conference device 103.

The method 400, in a further embodiment, connects 406 a client device 102 to a conference device 103 in response to receiving a connection confirmation from the client device 102. For example, a user may confirm connecting to the conference device 103 in response to accepting an invitation to connect to the conference device 103 displayed on the client device 102. In some embodiments, the method 400 connects 406 the client device 102 to the conference device 103 using the same or different communication protocol that was used to send the notification to the client device 102. For example, the method 400 may send 404 the notification to the client device 102 using a Bluetooth® connection, and the method 400 may connect 406 the client device 102 to the conference device 103 using a Wi-Fi communication channel such that content is transmitted between the client device 102 and the conference device 103 using Wi-Fi. In some embodiments, the connection module 206 connects 406 the client device 102 to the conference device 103, and the method 400 ends.

Figure 5:
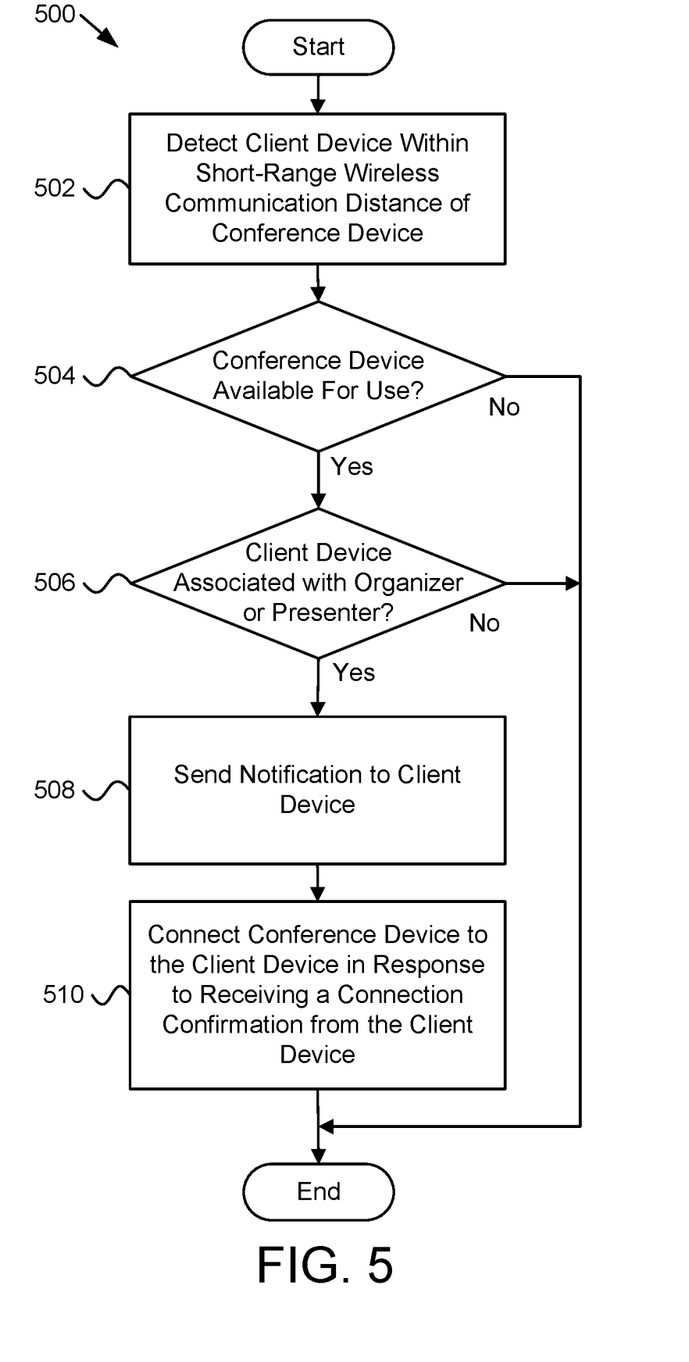
FIG. 5 is a schematic flow chart diagram illustrating one embodiment of another method for connecting to a conference device.

FIG. 5 depicts one embodiment of another method 500 for connecting to a conference device 103. In one embodiment, the method 500 begins and detects 502 a client device 102 that is within a short-range wireless communication distance of a conference device 103. In some embodiments, the device module 202 detects 502 a client device 102 that is within a short-range wireless communication distance of a conference device 103.

In a further embodiment, the method 500 determines 504 whether the conference device 103 is available in response to detecting a client device 102 within a short-range wireless communication distance of the conference device 103. In some embodiments, the notification module 204 determines 504 whether a conference device 103 is available. If the method 500 determines 504 that the conference device 103 is available for use, the method 500 determines 506 whether the detected client device 102 is associated with an organizer and/or presenter of the conference/meeting. For example, the method 500 may access a calendar event associated with the client device 102 to determine who the organizers/presenters of the meeting are and then determine whether a user/owner of the client device 102 is one of the organizers/presenters. If not, the method 500 does not send a notification to the client device 102, and the method 500 ends. In another embodiment (not shown), the method 500 sends a notification to the client device 102 that the conference device 103 is not available, and the method 500 ends.

In another example, the method 500 may access/query a directory service to determine the owner/user of the client device 102 (e.g., using an identifier for client device 102 such as an IP address, a MAC address, and/or the like). After determining the identity of the owner/user of the client device 102, the method 500 may determine whether the identified user is a designated organizer/presenter of the conference by checking a conference schedule, a reservation system, a calendar event associated with the client device 102, and/or the like. In some embodiments, the schedule module 302 and/or the directory module 304 determines 506 whether the client device 102 is associated with an organizer and/or a presenter of the conference.

In a further embodiment, the method 500 sends 508 a notification to a client device 102 in response to determining the client device 102 is available and that the client device 102 is associated with an organizer and/or presenter of the conference. The notification module 204, in one embodiment, sends 508 the notification to the client device 102. In certain embodiments, the method 500 connects 510 the conference device 103 to the client device 102 in response to receiving a connection confirmation from the client device 102, and the method 500 ends. In one embodiment, the connection module 206 connects 510 the client device 102 to the conference device 103. If the method 500 determines 506 that the client device 102 is not associated with the organizer or presenter, the method 500 ends. In another embodiment (not shown), if the method 500 determines 506 that the client device 102 is not associated with the organizer or presenter, the method 500 sends a notification that the user is not authorized, that the conference device 103 is not available, or the like, and the method 500 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a device module that detects a client device within a short-range wireless communication distance of a conference device, the conference device being reservable for a conference and configured to present content received from the client device;
   a notification module that sends a notification to the client device in response to determining that the client device is within the short-range wireless communication distance of the conference device, in response to determining that the conference device is available and in response to determining that the client device is authorized to connect to the conference device, the notification inviting the client device to connect to the conference device, the notification comprising upcoming reservation schedule information for the conference device, the upcoming reservation schedule information being based on an amount of time that the conference device is available; and
   a connection module that, in response to receiving a connection confirmation from the client device:

verifies that one or more specifications of the client device are compatible with the conference device; and communicatively couples the conference device to the client device over a short-range wireless communication protocol in response to verifying that the client device is compatible with the conference device.

2. The apparatus of claim 1, wherein the notification module sends a notification to the client device indicating that the conference device is unavailable in response to determining that the conference device is reserved.

3. The apparatus of claim 1, wherein the notification module sends the notification to the client device in response to determining that the client device is associated with a scheduled conference.

4. The apparatus of claim 3, further comprising a schedule module that checks a calendar event associated with the client device to determine whether the client device has been invited to the scheduled conference.

5. The apparatus of claim 4, wherein the schedule module determines whether the client device is associated with an organizer and/or a presenter of the conference based on the calendar event, the notification module sending the notification to the client device in response to determining that the client device is associated with the conference organizer and/or the conference presenter.

6. The apparatus of claim 3, further comprising a directory module that checks a directory service of an organization to determine whether the client device has been invited to the scheduled conference.

7. The apparatus of claim 6, wherein the directory module determines whether the client device is associated with an organizer and/or a presenter of the conference according to the directory service, the notification module sending the notification to the client device in response to determining that the client device is associated with the conference organizer and/or the conference presenter.

8. The apparatus of claim 1, wherein the notification module sends the notification to the client device in response to determining that the client device is on a predetermined list of devices authorized to connect to the conference device.

9. The apparatus of claim 1, wherein the notification module sends the notification to the client device in response to an organizer of a conference authorizing the client device to connect to the conference device.

10. The apparatus of claim 1, wherein the conference device is connected to the client device using a short-range wireless communication protocol, the short-range wireless communication protocol comprising a Bluetooth® protocol, a near-field communication protocol, an infrared communication protocol, a radio protocol, and/or a Wi-Fi protocol.

11. The apparatus of claim 1, wherein the conference device comprises a telephone, a projector, a computer, a television, and/or a sound system.

12. The apparatus of claim 1, wherein the notification is sent to the client device using an electronic message, the electronic message comprising a text message, an email, an instant message, and/or a push notification.

13. A method comprising:

detecting, by use of a processor, a client device within a short-range wireless communication distance of a conference device, the conference device being reservable for a conference and configured to present content received from the client device;

sending a notification to the client device in response to determining that the client device is within the short-range wireless communication distance of the conference device, in response to determining that the conference device is available and in response to determining that the client device is authorized to connect to the conference device, the notification inviting the client device to connect to the conference device, the notification comprising upcoming reservation schedule information for the conference device, the upcoming reservation schedule information being based on an amount of time that the conference device is available;

verifying, in response to receiving a connection confirmation from the client device, that one or more specifications of the client device are compatible with the conference device; and communicatively coupling the conference device to the client device over a short-range wireless communication protocol in response to verifying that the client device is compatible with the conference device.

14. The method of claim 13, further comprising sending a notification to the client device indicating that the conference device is unavailable in response to determining that the conference device is reserved.

15. The method of claim 13, further comprising sending the notification to the client device in response to determining that the client device is associated with a scheduled conference.

16. The method of claim 15, further comprising checking a calendar event associated with the client device to determine whether the client device has been invited to the scheduled conference.

17. The method of claim 16, further comprising determining whether the client device is associated with an organizer and/or a presenter of the conference based on the calendar event, the notification being sent to the client device in response to determining that the client device is associated with the conference organizer and/or the conference presenter.

18. The method of claim 15, further comprising checking a directory service of an organization to determine whether the client device has been invited to the scheduled conference.

19. The method of claim 18, further comprising determining whether the client device is associated with an organizer and/or a presenter of the conference according to the directory service, the notification being sent to the client device in response to determining that the client device is associated with the conference organizer and/or the conference presenter.

20. A program product comprising a non-transitory computer readable storage medium that stores code executable by a processor, the executable code comprising code to perform:

detecting a client device within a short-range wireless communication distance of a conference device, the conference device being reservable for a conference and configured to present content received from the client device;

sending a notification to the client device in response to determining that the client device is within the short-range wireless communication distance of the conference device, in response to determining that the conference device is available and in response to determining that the client device is authorized to connect to the conference device, the notification inviting the client device to connect to the conference device, the notification comprising upcoming reservation schedule information for the conference device, the upcoming reservation schedule information being based on an amount of time that the conference device is available;

verifying, in response to receiving a connection confirmation from the client device, that one or more specifications of the client device are compatible with the conference device; and communicatively coupling the conference device to the client device over a short-range wireless communication protocol in response to verifying that the client device is compatible with the conference device.

* * * * *